(No Model.)
P. WHITE.
STOP BOX.
No. 346,969. Patented Aug. 10, 1886.
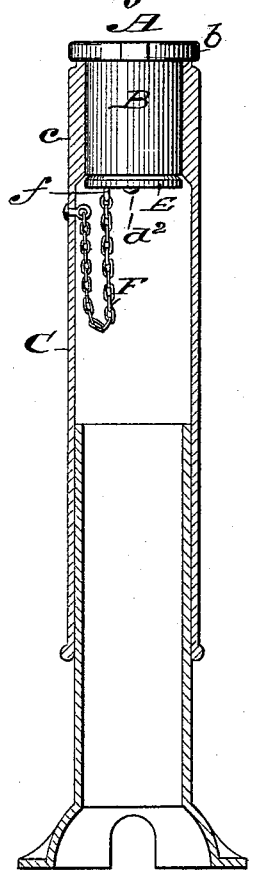
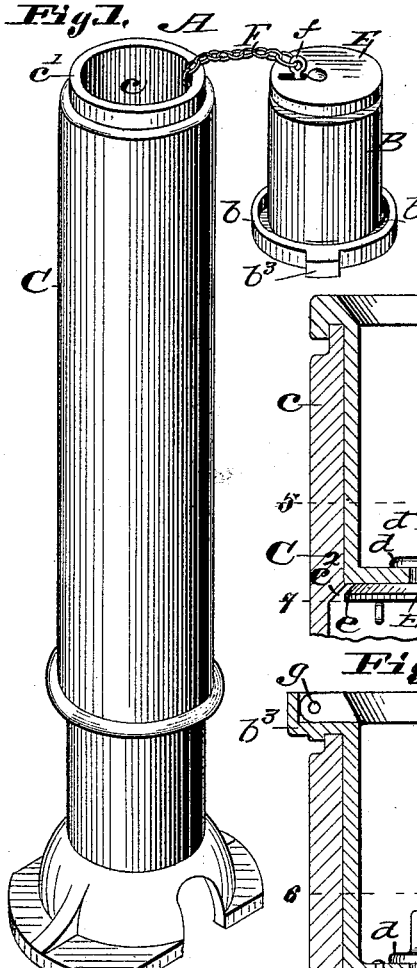
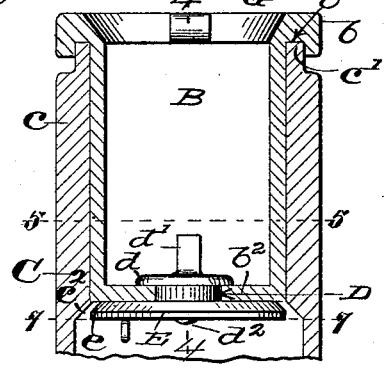
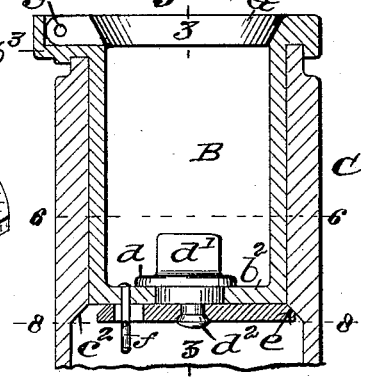
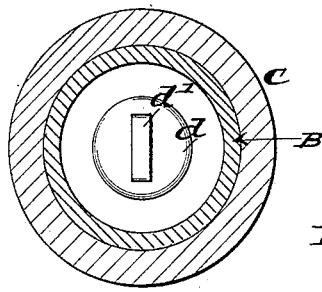
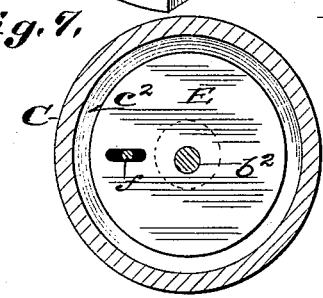
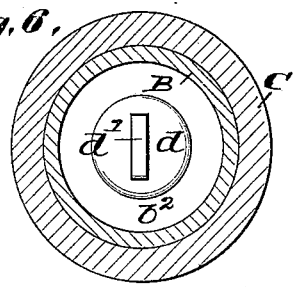
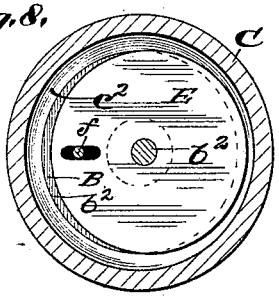
Attest
Charles Pickles
C. E. Hunt
Inventor,
Peter White
by C. D. Moody
atty
N. PETERS, Photo-Lithographer, Washington, D. C.

UNITED STATES PATENT OFFICE.

PETER WHITE, OF ST. LOUIS, MISSOURI.

STOP-BOX.

SPECIFICATION forming part of Letters Patent No. 346,969, dated August 10, 1886.

Application filed July 22, 1884. Serial No. 138,509. (No model.)

*To all whom it may concern:*

Be it known that I, PETER WHITE, of St. Louis, Missouri, have made a new and useful Improvement in Stop-Boxes, of which the following is a full, clear, and exact description, reference being had to the annexed drawings, making part of this specification, in which—

Figure 1 is a view in perspective of a stop-box having the improvement, the top being detached from its position and shown the bottom end upward; Fig. 2, a vertical section of the stop-box, the top being in position; Fig. 3, a vertical section, upon an enlarged scale, of the upper end of the stop-box, the section being on the line 3 3 of Fig. 4; Fig. 4, a vertical section of the upper end of the stop-box, the section being on the line 4 4 of Fig. 3; Fig. 5, a horizontal section on the line 5 5 of Fig. 3; Fig. 6, a horizontal section on the line 6 6 of Fig. 4; Fig. 7, a horizontal section, looking upward, on the line 7 7 of Fig. 3; and Fig. 8, a horizontal section, looking upward, on the line 8 8 of Fig. 4.

The same letters of reference denote the same parts.

The stop-box is of the customary form, saving as modified by the improvement which relates to the construction and mode of fastening the cover of the stop-box.

A, Figs. 1, 2, represents a stop-box having the improvement.

B represents the cover of the stop-box. It is cup-shaped and adapted to fit downward into the upper end, $c$, of the casing C of the stop-box, the upper end of the cover B being furnished with a flange, $b$, which is adapted to rest upon the upper end of the casing C, and, preferably, is grooved, substantially as shown at $b'$, to fit onto a corresponding projection, $c'$, of the casing. The bottom $b^2$ of the cover is perforated vertically to receive a part which may be termed a "shaft" or "disk," D. Above the perforation the disk is enlarged to form or is provided with a flange, $d$, which serves to support the disk in the cover-bottom, and above the flange the disk is provided with or is shaped to form a handle, $d'$. Below the cover-bottom the disk is provided with a pin, $d^2$, which is slightly out of line with the center of the disk— that is, the axis of the pin is eccentric to the axis of the disk.

E represents a disk, which is hung upon the pin $d^2$, and by means of it upheld beneath the cup-bottom, the pin at its lower end for that purpose being suitably headed, substantially as shown. The disk E in diameter is not larger than the cover B; but the disk is adapted to operate in connection with the shoulder $c^2$, extending around the interior of the casing C, below the level of the cover B, and substantially as follows: When the cover B is to be placed in position in the stop-box, the disk D, by means of its handle $d'$, is rotated so as to bring the disk E into a position in which it is concentric with the cover-bottom; for as the disk D is rotated in its bearing in the cup-bottom forward and backward the disk E, by means of the pin $d^2$, is moved so as to be concentric with or eccentric to the cover-bottom. After the cover is in position, as represented in Fig. 3, the disk D is rotated in the cover-bottom so as to make the disk E eccentric to the cover-bottom, as shown in Fig. 4, in which position the edge $e$ of the disk E comes beneath the shoulder $c^2$ of the casing C. This causes the cover B to become locked in the casing C, so that it cannot be withdrawn therefrom, and before the cover can be withdrawn the disk D must be rotated so as to bring the disk E into its concentric position again. As there is but one position in which the disk E is thus concentric with the cover-bottom, and as there are many other positions in all of which the disk E is eccentric to the cover-bottom, the cover is very readily locked in the casing C, and it cannot well be unlocked therein unless by a person well acquainted with the construction of the device. Improper interference with the stop-box, therefore, is practically prevented.

To prevent the cover B, when withdrawn from the casing C, from being wholly detached therefrom, the cover, by means of the chain F, is permanently connected with the casing. For this purpose one end of the chain is attached to the cover, and, preferably, by attaching the chain to an eyebolt, $f$, which passes upward through a slot in the disk E into the cover-bottom, substantially as shown in Fig.

4, and the other end of the chain is fastened to the casing C, substantially as shown in Fig. 2.

If it is desired to close the upper end of the cup-shaped cover B, it can be done by the means shown.

G represents a lid, which at $g$, Fig. 4, is hinged to the cover B, and is adapted to fit the upper end of the cover B, substantially as shown in Figs. 3, 4. In such case the upper end of the cover B is at $b^3$ suitably shaped to provide for the hinging of the lid G. By beveling the shoulder $c^2$ of the casing C, and also beveling the edge $e$ of the disk E, the flange $b$ of the cover B is drawn, when the cover is locked, tightly down upon the upper end of the casing C, and the cover thereby made to tightly close the casing. It will be noted that in the act of engaging with the shoulder $c^2$ the disk E will act as a roller as it bears against the vertical wall of the box, or against the shoulder, if it be beveled. It can thus be turned into a much tighter and more secure engagement with the box than if its contact with the latter were frictional.

I am aware that the covers of the stop-boxes have been heretofore provided with a portion adapted to be rotated so as to engage with the box, or with inclined planes thereon, and I do not claim such construction, broadly.

I claim—

The combination of the casing C, provided with the circumferential shoulder $c^2$, the cover B, adapted to fit in said casing and having the lateral extension or flange $b$, the disk D, pivoted in the cover, and the beveled disk E, eccentrically pivoted to said disk D and adapted to engage with the shoulder $c^2$, whereby the flange $b$ is drawn against the top of the casing, and the cover also locked laterally against the side thereof, substantially as set forth.

PETER WHITE.

Witnesses:
C. D. MOODY,
C. E. HUNT.